Figures 1, 2:
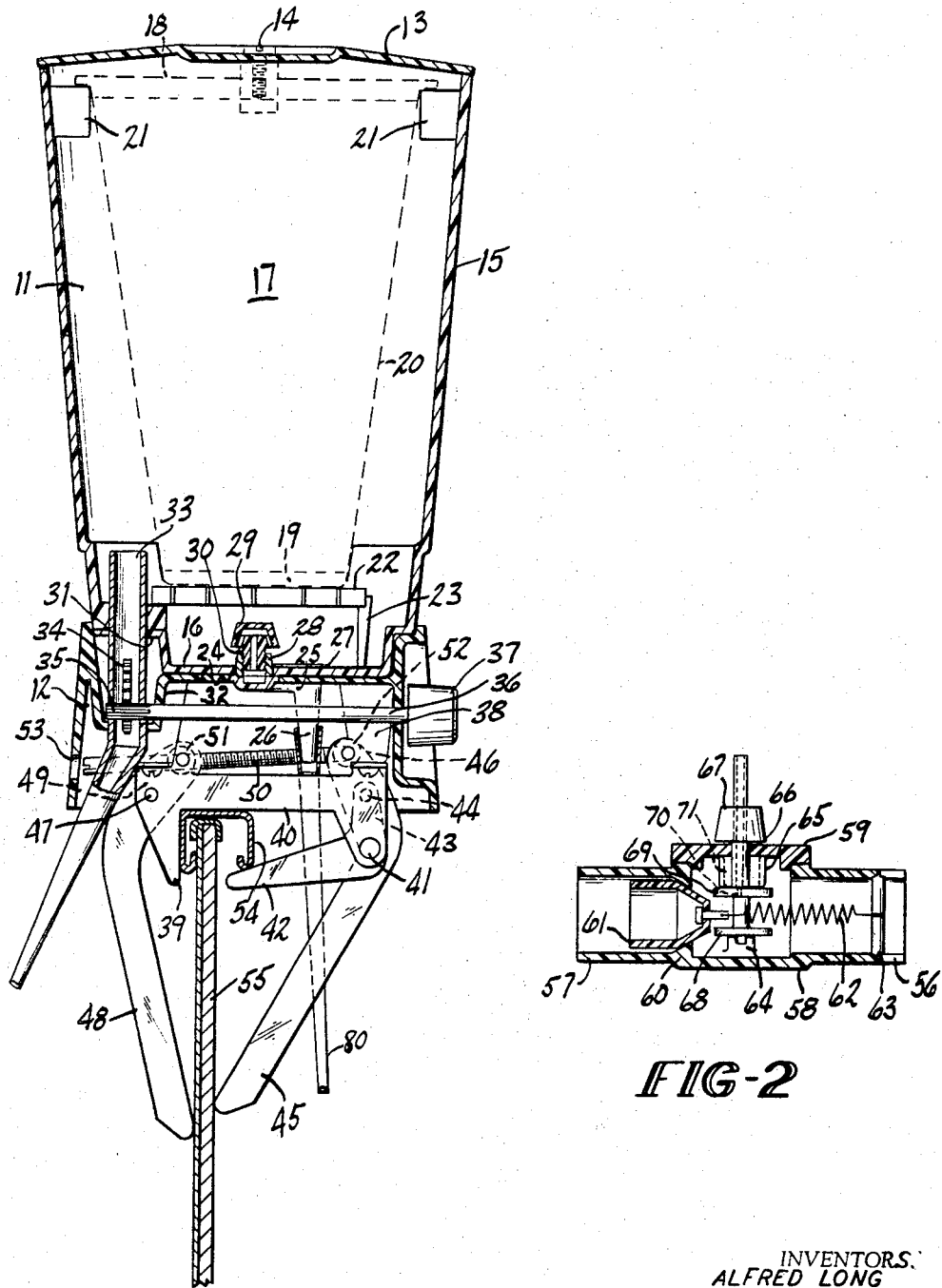

Dec. 17, 1968   A. LONG ET AL   3,416,897
CHEMICAL DISSOLVER FOR FEEDING A SOLUTION
Filed Oct. 19, 1965   2 Sheets-Sheet 1

INVENTORS.
ALFRED LONG
EDWIN S. ROTH
PHILLIP W. KING
KENNETH A. VAN·DYCK
BY
AGENT

United States Patent Office 3,416,897
Patented Dec. 17, 1968

3,416,897
CHEMICAL DISSOLVER FOR FEEDING
A SOLUTION
Alfred Long and Edwin S. Roth, New Haven, Phillip W. King, Cheshire, and Kenneth A. Van Dyck, Southport, Conn., assignors to Olin Mathieson Chemical Corporation
Filed Oct. 19, 1965, Ser. No. 498,047
2 Claims. (Cl. 23—267)

This invention relates to apparatus for the preparation and controlled feeding of aqueous solutions of solid particulate materials. More particularly, the apparatus provides means for preparing aqueous solutions of water-soluble solids and dispensing said solutions at controlled rates. Still more particularly, this invention relates to apparatus for supplying solutions containing available chlorine over a wide range of concentrations from solid hypochlorite compositions in conveniently handled granular, pressed or tabletted forms at accurately controlled rates for use in a variety of chlorination and water treating applications differing widely in the ultimate concentration of the solution required.

In the treatment of water supplies, including particularly, above- and below-ground swimming pools, a supply of aqueous solution of an available halogen compound, preferably a hypochlorite is commonly metered into a flowing body of the liquid to be treated. Such practice requires the purchase of solutions or requires the preparation of solutions from a dry available halogen compound at the point of use. Sodium hypochlorite solutions are available commercially at concentrations not exceeding 15% of available chlorine but such solutions deteriorate rapidly during shipment and storage. Solid sodium hypochlorite compositions are not available because they are very unstable. Calcium hypochlorite, on the other hand, particularly in the form of high test hypochlorite, can be shipped as a relatively stable solid containing 70% or more of available chlorine and can be stored for long periods without appreciable loss of available chlorine.

In spite of the advantages of solid calcium hypochlorite over other sources of available halogen for use as a sterilizing agent, there is a problem in applying the solid directly to water in such a manner that only a few parts per million of available chlorine is ultimately present in the water. In conventional methods of application in swimming pools, granular calcium hypochlorite is sometimes added directly as solid to the pool water or tablets are placed in the skimmer or in dissolving baskets around the pool. Preferably, however, solid calcium hypochlorite is dissolved in water to form a solution of desired concentration which is metered into the water in the circulating system at a rate to maintain residual chlorine generally at 0.3 to 0.6 part per million in the pool. However, in the conventional method of application, there is difficulty with sludge formation in making up the solution. The sludge tends to clog filters and sensitive metering devices used to supply the solution in small amounts to the body of liquid to be treated. Consequently, it is necessary to clean these devices frequently or to filter the sludge from the solution prior to passing the solution through the metering devices. Using the apparatus of this invention, a material in solid particulate form, for example, calcium hypochlorite, can be effectively and continuously dissolved at variable but accurately controllable rates. The resulting solutions having a wide range of available chlorine concentrations can be supplied without further treatment to the point of ultimate consumption suitably by introduction into a flowing liquid system or directly into the body of water to be treated. Control of the concentration of solute is provided by accurate control of the amount of contact between the solid particulate material and the dissolving water.

The apparatus of the present invention provides means for dissolving a solid particulate material, for example, calcium hypochlorite in tabletted form at variable but accurately controllable rates for the treatment of water without preparing large quantities of stock solutions of hypochlorite. The apparatus of this invention has the important advantage of directly controlling the flow rate of hypochlorite solution into the body of water being treated instead of metering the water introduced into the feeder to form the hypochlorite solution. Clogging of the metering device is avoided since the hypochlorite solution flows freely into the body of water being treated carrying with it any suspended matter from the feeder. The suspended matter dissolves completely in the large body of water being treated. In addition, the apparatus of this invention permits remarkably accurately calibration and provides constant and reproducible rates of feed.

In general, the apparatus of the present invention comprises a vertically elongated container, a skirt, a clamp, a charge unit or cartridge and a control valve, separately and in combination, as apparatus for the treatment of water.

The container has a removable top for charging the solid particulate material, suitably in a charge unit or cartridge. The container has a water inlet and water distributing means adapted to direct fine streams of water downwardly to maintain undissolved sludge in suspension. The container has a water outlet adjustable in elevation to control depth of the water in the container and the amount of particulate solid in contact with water at any time. The tubular water outlet is of suitable diameter to avoid clogging by any suspended sludge.

The cartridge suitably has a solid top, a foraminous bottom and flexible perforated sides joining the top and bottom. The material of the sides is selected to be compatible with the nature of the particulate solid material to be dissolved. When the solid is hypochlorite the material of the cartridge sides is appropriately Dacron, nylon, polyethylene, polypropylene or other materials resistant to the action of available chlorine. The perforations in the sides of the cartridge and in the foraminous bottom are appropriate to contain the particulate solid. With commercially available calcium hypochlorite tablets, a mesh size of ¼ to ½" is suitable. The flexible cartridge sides are spaced from the container sides and avoid any problem of bridging of the wet particulate solid, a serious problem in a cartridge with inflexible perforated sides.

The cartridge sides taper slightly inwardly toward the cartridge bottom forming an angle of 80° to 89° to the horizontal. Sides having angles to the horizontal in this range are free from problems of bridging which prevents contact of the water at a given level in the container with a constant and adequate amount of the particulate solid charged to the cartridge.

A skirt is attached, suitably by friction, cement or other means, to the bottom of the container to enclose and support the mechanism for adjusting the elevation of the tubular water outlet and the mechanism for adjusting the clamp provided for support of the feeder in a convenient location. The water outlet of the container is a vertically arranged tubular member which incorporates a rack parallel to its axis and extending partially along its length. The rack engages a pinion of a shaft extending through the skirt and terminating in a knob for manual adjustment. The elevation of this water outlet controls the water level maintained in the container and the amount of particulate material in contact with the water. The rate of dispensation of the particulate material dissolved in the effluent solution is thus controlled. Indicia are optionally provided on the skirt and around the knob to facilitate accurate and repetitive adjustment of the elevation of the water outlet.

To provide for convenient use, a novel clamp mechanism is provided attached to a partition in the skirt attached to the container. The clamp mechanism consists of a first and second pair of identical jaws adapted to cooperate in engaging a first structure, for example, the rail of an above-ground swimming pool and a third pair of jaws adapted to cooperate in engaging a second structure, for example, the walls of a pool. To provide suitable adjustability to various structures, each of the first and second pair of jaws consists of one rigid jaw member and a pivoted jaw member. Each of the rigid jaw members has a first pivotal connection and includes a horizontal extension. Support means are attached to the rigid jaw members and their extensions to permit attachment, for example, to the base of the feeder. Each pivoted jaw member is attached to one of the extensions by a second pivotal connection and includes a first lever arm having therein a third pivotal connection spaced from the second pivotal connection to support the first jaw member of the third pair of jaws. The second jaw member of the third pair of jaws is mounted between the rigid jaw members of the first and second pair of jaws by said first pivotal connections. Each jaw member of the third pair of jaws includes a second lever arm and manually adjustable means connecting said second lever arms are provided to open and close the third pair of jaws. Suitably these manually adjustable means are a threaded shaft rotatably anchored in a swivel in the second lever arm of the first jaw member of the third pair of jaws and threaded through a second swivel in the second lever arm of the second jaw member of the third pair of jaws. An opening in the skirt of the feeder provides access to the manual adjustment means. When the latter is moved, all of the jaws of the clamp are opened or closed and the attached feeder or other object is firmly held on structures of various shapes, for example, the rail and wall of an above ground swimming pool.

The concentration of the particulate solid material dissolved in the water effluent from the container is controlled by providing a constant volume of inlet water and controlling the extent of contact of the water with the solute and, in turn, the concentration in the effluent from the container. The constant amount of inlet water is provided by a control valve, more particularly described as a stream-splitting check valve suitably fabricated of molded nylon or other chemically resistant plastic. The control valve has an inlet section, an outlet section and a center section consisting of a body and a cover. The outlet section has a valve plug and a valve seat with spring means to urge the plug against the seat, the main flow of water passing the plug in its circulation from and to the body of water being treated. A side stream of water is removed from the control valve through a port in the valve and an outlet in the cover of the control valve, the side stream being delivered to the inlet of the container.

To separate the side stream, a stream-splitter is provided in the body of the center section of the valve. The stream-splitter consists of a shaft supported between an upper and a lower thrust bearing and having a lower wing attached to the shaft below the spring means in the check valve and an upper wing attached to the shaft above the spring means in the check valve. A port is provided in the upper wing in alignment with a tubular outlet in the cover of the center section at the limit of oscillation of the stream-splitter in one direction and out of alignment with the outlet in the cover at the limit of oscillation of the stream-splitter in the opposite direction.

The volume of the side stream diverted to the container is controlled by the size of the port in the upper wing of the stream-splitter and by the pressure of water entering the control valve. When it is necessary for any reason to stop the flow of water to the feeder, the stream-splitter is turned to its opposite limit, moving the port out of alignment with the outlet in the cover and stopping the flow of the side stream.

In a system for treating a body of water, for example, in a swimming pool, the feeder is suitably clamped to the rail and wall of the swimming pool and a first conduit is arranged to communicate from the vertically arranged tubular member of the container to the body of water. A second conduit is arranged to communicate from the body of water to a pump and a third conduit is arranged to communicate from the pump to a filter. A fourth conduit is arranged to communicate from the filter to the inlet section of the control valve. A fifth conduit is arranged to communicate from the outlet section of the control valve to the body of water in the swimming pool. A sixth conduit is arranged to conduct the side stream from the control valve to the tubular inlet to the container.

In FIGURE 1, the feeder consists, generally, of container 11 attached to skirt 12. The container has a container top 13, removable by means of screws 14, container sides 15 and container bottom 16. Within the container is charge unit cartridge 17 consisting of cartridge top 18, cartridge bottom 19 and cartridge sides 20, suitably formed, for example, of a mesh fabric advantageously of a material resistant to the action of available chlorine solutions, for example, Dacron or polypropylene. The charge unit is supported from cartridge top 18 on projections 21 attached to or integral with container sides 15. Within container 11 is pedestal 22 supported on pedestal legs 23 to provide support for cartridge bottom 19.

Skirt 12 has horizontal partition 24 cut away to receive channel 25 recessed in container bottom 16. Channel 25 extends radially from the center to the side of container bottom 16. At the end of channel 25 near the side of container bottom 16, is downwardly depending tubular inlet 26. Channel 25 has a cover 27 with an upwardly extending tubular inlet 28 terminating in cap 29 having downwardly directed ports 30. Upwardly extending projection 31 is located near the side of container bottom 16. Partition 24 has downwardly extending projection 32 which cooperates with projection 31 to guide vertically arranged tubular member 33. On the side of tubular member 33 is incorporated rack 34 arranged parallel to the axis of the tubular member 33 and extending partially along its length. Cooperating with rack 34 is pinion 35 on shaft 36 which extends horizontally through skirt 12 and terminates in knob 37 for manual adjustment of the vertical elevation of tubular member 33 to control the depth of water in container 11.

Clamp legs 38 attached to partition 24 provide support for a first and a second pair of jaws, each consisting of rigid jaw members 39 and pivoted jaw members 42. Rigid jaw members 39 have horizontal extensions 40 including pivot 41 supporting pivoted jaw members 42. Each pivot jaw member 42 has incorporated therewith a lever arm 43 with pivot 44 in said lever arm to support jaw member 45 of a third pair of jaws. Jaw member 45 has lever arm 46 extending beyond pivot 41. Pivot 47 in rigid jaw member 39 supports jaw member 48 of the third pair of jaws. Jaw member 48 incorporates a lever arm 49 extending beyond pivot 47. Threaded manual adjustment means 50 joins threaded swivel 51 and anchor swivel 52 in lever arms 46 and 49 to provide means for opening and closing all three pairs of jaws. Adjustment means 50 is conveniently reached by access opening 53 in skirt 12. FIGURE 1 shows the feeder clamped to pool rail 54 and pool wall 55.

FIGURE 2 shows the control valve. Its housing has inlet section 56, outlet section 57 and a center section having body 58 and cover 59. Body 58 has valve seat 60 on which bears valve plug 61 urged by spring 62 anchored by pin 63 in inlet section 56. Valve plug 61 and valve seat 60 constitute the check valve portion of the control valve. Within body 58 is lower thrust bearing 64. Upper thrust bearing 65 is incorporated in or integral with cover 59 and has a hollow core. The stream-splitter consists of shaft 66 terminating at its lower end in lower thrust bearing 64 with its upper portion passing through the hollow center in upper thrust bearing 65, through cover 59 and terminating in knob 67 for manual oscillation between an open and a closed position. Lower wing 68 is attached perpendicularly to shaft 66 below spring 62 and upper wing 69 is attached perpendicularly to shaft 66 above spring 62. In upper wing 69 is port 70 in alignment with tubular outlet 71 when the stream-splitter is at the limit of its oscillation in one direction and out of alignment with tubular oulet 71 at the limit of its oscillation in the opposite direction. Upper wing 69 bears against upper thrust bearing 65 and against tubular outlet 71 to provide a water seal when the stream-splitter is in the closed position. Oscillation of the stream-splitter is limited by the walls of body 58.

Figure 3:
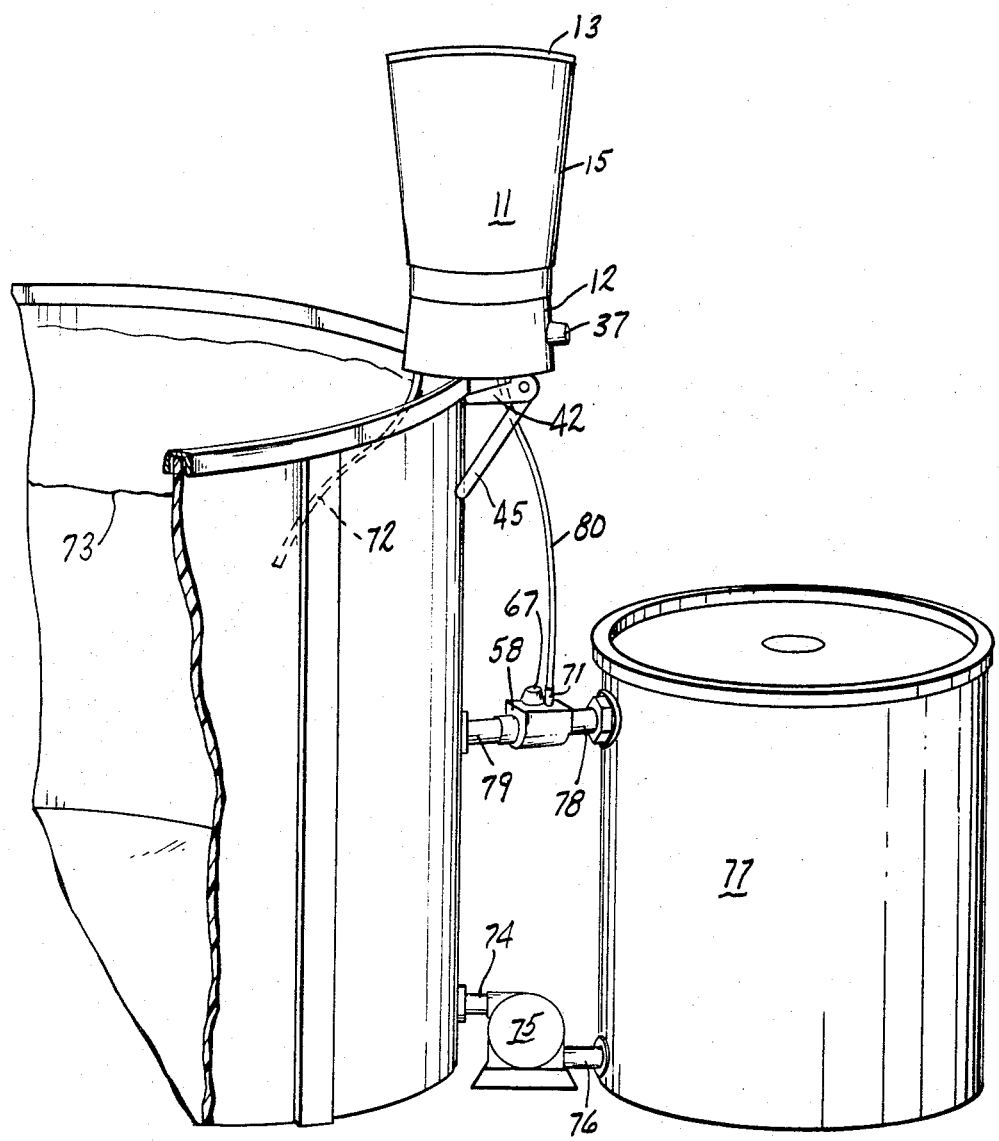

In FIGURE 3 the feeder is shown in combination with an above-ground swimming pool. A first conduit 72 communicates from tubular member 33 (not seen in FIGURE 3) to a body of water 73. A second conduit 74 communicates from body of water 73 to pump 75 and a third conduit 76 communicates from pump 75 to filter 77. A fourth conduit 78 communicates from filter 77 to control valve having parts numbered as before. A fifth conduit 79 communicates from the outlet section of the valve to body of water 73 and a sixth conduit 80 communicates from tubular outlet 71 of said valve to inlet 26 (not seen in FIGURE 3) of the feeder.

In operation, water is introduced into the feeder through tubular inlet 26. It flows through channel 25, upwardly extending tubular inlet 28 and downwardly directed ports 30 in cap 29. The streams of water maintain any sludge in suspension and avoid accumulation thereof in the container. Suitably the inlet water is derived from a larger body of water to be treated and is moved by pump 75 through filter 77 and the control valve. The main flow of water passes into the control valve via inlet section 56 and leaves via outlet section 57. The stream-splitter separates a small stream from the main flow and passes it via conduit 80 to tubular inlet 26 of the feeder. The level of water in container 11 is controlled by adjustment of the elevation of tubular member 33. While in contact with the particulate solid material in the cartridge, dissolution occurs and the solution, including any minor proportion of undissolved particles, passes through tubular member 33 and returns to the body of water being treated.

When it is necessary to replenish the supply of particulate solid, the empty cartridge is removed and a filled cartridge is inserted in the container.

In use with above-ground swimming pools, the clamp of this invention is particularly advantageous. The rigid jaws of the first and second pair of clamps are applied inside the rail of the pool with the second jaw member of the third pair of jaws against the inner wall of the pool. By threaded adjustment means 50, pivoted jaw members 42 are brought up against the underside of the rail of the pool and simultaneously the first jaw member of the third pair of jaws is brought up against the outside of the wall of the pool. The feeder is firmly attached to the pool until it is freed by threaded adjustments means 50.

The design principles of the present invention can generally be used advantageously when it is desired to dispense solutions of chemicals supplied in solid particulate form at accurately controlled rates which may be varied simply by controlling the depth of submergence of the particulate solid. The feeder of this invention is particularly useful in the application of solid hypochlorites, for example calcium hypochlorite, to bodies of water such as, for example, in treating water of swimming pools, water plants in small municipalities, bottling plants, dairies, cooling systems, etc., where the addition of a sterilizing agent is desirable. It also can be advantageously used in the treatment of industrial wastes to destroy color, odor, and toxic constituents, and for odor and bacterial control in sewage effluents. Pressed tablets of hypochlorite are especially suitable in the present apparatus, but other shapes and sizes of particles may also be used. The apparatus is adaptable for dissolving and feeding other chemicals, for example, sodium fluoride in minor amounts for water supplies, polyphosphates and compositions containing them for water softening, soda ash furnished as briquettes or fused soda ash for adjusting the alkalinity of a treating solution, sodium chloride, alum and available chlorine compounds other than hypochlorite including, for example, dichlorocyanuric acid, trichlorocyanuric acid, and their salts, tetrachloroglycoluril and 1,3-dihalo-5,5-dimethylhydantoins including particularly 1,3-dichloro-5,5-dimethylhydantoin and 1-chloro-3-bromo-5,5-dimethylhydantoin.

The materials of construction in contact with the solid hypochlorites, for example calcium hypochlorite, or solutions of hypochlorites are preferably resistant to its action. Particularly suitable for this purpose are a considerable number of plastic compounds such as, for example, Lucite which has the additional advantage of transparency. Other portions of the apparatus may be constructed of molded resins, for example, Bakelite, nylon, polyvinyl chloride and polystyrene and of conventional materials including copper, brass, stainless steels and titanium.

The apparatus of the present invention can be fabricated at low cost compared to other dispensing equipment. It is of compact construction, can be quickly installed, requires a minimum of maintenance, is safe to use, simple to operate and involves no accident hazards. It requires the preparation of no stock solutions of the chemicals used. Once charged and set, it can be depended upon to operate reliably without further attention until the charge of solid chemical is spent. A suitable adjustment device controls the depth of water in the container so that the degree of treatment can be varied over wide limits and can be changed quickly to accommodate fluctuations in demand.

EXAMPLE

A feeder was constructed consisting of a container, skirt and included parts, clamps and a charged cartridge. The container was molded of polystyrene in frusto-conical shape. The container had molded projections 21 for the support of the cartridge from the cartridge top 18. Polypropylene fabric (¼ inch mesh) was used to form the sides. Before sealing the fabric to the top of the cartridge, it was filled with calcium hypochlorite tablets ½ inch thick and having a diameter of 1¼ inches. When the cartridge was hung in the container with its top resting on the projections, contain bottom 19 was supported on pedestal 22 of the container. First and second pairs of jaws were constructed of metal and the third pair of jaws was constructed of polystyrene, assembled with other parts as described above. Water was pumped from an above-ground swimming pool through a filter and a control valve as described above. The inlet, outlet and center section of the check valve and plug 61 were molded nylon. The plug was held against its seat by a spring and pin in the inlet section of the valve. The stream-splitter was molded polystyrene, inserted into the body of the check valve. The molded nylon cover was applied and knob 67 was applied to the shaft of the stream-splitter.

With the stream-splitter in the open position, the pump provided inlet water to the container. Elevation of tubular member 33 controlled the concentration of calcium hypochlorite in the effluent solution returned to the body of water in the swimming pool. The feed rate was adjusted for a 2500 gallon pool to maintain an available chlorine concentration therein between one and two parts per million. At this rate a cartridge 2½ inches in diameter at the bottom with sides having an angle of 81° to the horizontal and containing 2 pounds of calcium hypochlorite tablets maintained this concentration of available chlorine in the pool water for 42 days.

What is claimed is:
1. A feeder for preparing aqueous solutions of water- soluble solids and dispensing said solutions at controlled rates, said feeder comprising in combination:

(1) a vertically elongated container including:
   (a) a removable container top, a container bottom and container sides;
   (b) a first opening in said container bottom defined by a channel recessed in and extending radially across said container bottom, said channel having an inner end including the center line of said feeder and an outer end near the periphery of said container bottom; a tubular inlet communicating with said channel and extending downwardly therefrom; a cover on said channel including an upwardly extending tubular outlet near its inner end; a cap terminating and overhanging said outlet and having downwardly directed openings in its over hanging portion;
   (c) a second opening in said container bottom defined by a circular projection extending above said container bottom;
   (d) a foraminous pedestal supported above the level of the said first and second openings;

(2) a skirt extending below said container bottom; a horizontal partition in said skirt in contact with the outside of said container bottom; a first opening in said partition to receive said recessed channel; a second opening in said partition defined by a downwardly extending projection in vertical alignment with the projection extending above the bottom of the container; a vertically arranged tubular member mounted for limited vertical movement within said projections; a horizontally arranged manually operated shaft mounted in said skirt and having a pinion at one end thereof; a rack attached to said tubular member and operably connected to said pinion whereby the elevation of said tubular element above said container bottom is manually adjustable and (3) a cartridge disposed in said container including:
   (a) a solid catridge top;
   (b) a formaminous cartridge bottom;
   (c) flexible, perforated cartridge sides fixedly attached to the peripheries of said cartridge top and said cartridge bottom;
   (d) said cartridge top overhanging said cartridge bottom and said cartridge sides; and
   (e) projections near the top and interiorly of the container sides to provide support for said cartridge.

2. The feeder as set forth in claim 1 in which the foraminous bottom of said cartridge rests in contact with the pedestal of said container.

References Cited

UNITED STATES PATENTS

| | | | |
|---|---|---|---|
| 580,303 | 4/1897 | Bailey | 23—272.8 |
| 664,387 | 12/1900 | Doderlein | 23—272 |
| 2,135,969 | 11/1938 | Donaldson | 23—272.7 X |
| 2,238,969 | 4/1941 | Butterfield | 23—272.8 X |
| 2,501,260 | 3/1950 | Brodin | 23—272.6 X |
| 2,663,314 | 12/1953 | Palmer | 23—272.7 X |
| 2,820,701 | 1/1958 | Leslie | 23—272.8 X |
| 3,089,508 | 5/1963 | Schulze | 23—272 X |
| 3,190,726 | 6/1965 | Rudelick | 23—272 X |

NORMAN YUDKOFF, *Primary Examiner.*

S. EMERY, *Assistant Examiner.*

U.S. Cl. X.R.

23—272.6, 272.7, 311; 239—310; 137—268